May 12, 1964　　　R. LE CHAPTOIS　　　3,132,728
CONTROL SYSTEM FOR AN ELECTROMAGNETIC CLUTCH
Filed Sept. 30, 1960　　　　　　　　　　　　　2 Sheets-Sheet 1

Raymond Le Chaptois
INVENTOR
BY Irvin S. Thompson
ATTORNEY

May 12, 1964 R. LE CHAPTOIS 3,132,728
CONTROL SYSTEM FOR AN ELECTROMAGNETIC CLUTCH
Filed Sept. 30, 1960 2 Sheets-Sheet 2

Raymond Le Chaptois
INVENTOR
BY Irvin S. Thompson
ATTORNEY

United States Patent Office 3,132,728
Patented May 12, 1964

3,132,728
CONTROL SYSTEM FOR AN ELECTROMAGNETIC CLUTCH
Raymond Le Chaptois, Marnes-la-Coquette, France, assignor to Societe Anonyme Francaise du Ferodo, Paris, France, a corporation of France
Filed Sept. 30, 1960, Ser. No. 59,633
Claims priority, application France Oct. 12, 1959
8 Claims. (Cl. 192—.07)

The present invention relates to a control for an electro-magnetic clutch, especially for automobile vehicles, and more particularly to such a control in which the electric circuit comprises a variable resistance coupled to the acceleration control, such a means of regulation being adapted for association with any other type of control, such for example as a supply voltage controlled by the speed of rotation of the engine (source constituted by the generator, etc.).

In the known controls of this kind, the displacement of the slider on the resistance is associated in a direct manner with the displacement of the butterfly-valve actuated by the accelerator pedal. This arrangement provides correct operation when it is accompanied by certain ancillary arrangements, in particular that which consists in mounting a micro-switch on the gear-box in order to obtain two different ranges of resistance steps, depending on whether the gear-box is in one of the low gears—first gear or reverse gear—or in a high gear, second gear or third gear. However, the ancillary arrangements referred to above, and more particularly the micro-switch, are undesirable from certain points of view. The micro-switch complicates the gear-box, necessitates electrical conduits, must be of careful construction so as to operate without failure, and complicates any search for the cause of possible mishaps. Its elimination necessitates compromises which are difficult to achieve with the known controls having direct coupling, since it is necessary simultaneously to preserve a good progression of starting with the lower ratios of the gear-box and an effective engine brake with the higher ratios.

The present invention has for its object a control for an electro-magnetic clutch of the kind above referred to, with a variable resistance, either continuous or discontinuous, with contact studs, which is free from the above drawbacks and which responds better than the known systems to the various requirements of practice.

A control in accordance with the invention is especially characterized in that the coupling of the rheostat slider to the acceleration control, for example the usual pedal, comprises a modifying device responsive to the driving torque, or to another factor which is closely related to it, such as the degree of vacuum in the engine admission pipe. This device preferably consists of a pressure responsive actuator connected through conduit means with the admission pipe.

This coupling is preferably a link-rod system, and the modifying device consists of a section of this system, the length of which varies, advantageously between two predetermined limits, as a function of the degree of vacuum in a chamber connected to the admission chamber of the engine. By virtue of this arrangement, the current consumption of the clutch is reduced during the most frequent utilization of the vehicle, that is to say at cruising speed. In fact, the torque required from the engine is then relatively small and the relatively large vacuum at the admission results in a part of the resistance being introduced into the circuit which correspondingly reduces the current consumption. In addition, the resistance of the circuit when the accelerator pedal is released is not the same when the engine is rotating and when it is stopped. It is greater in the first case than in the second. Thus, when the engine is idling, the torque transmissible by the clutch is sufficiently small to avoid driving the vehicle when stationary, whereas when the engine is stopped, the torque transmissible by the clutch is sufficiently high to permit sure and positive immobilization of the vehicle when stationary with the engine stopped and a gear engaged. In addition, it will be noted that the displacement of the rheostat slider is partly produced by the movement of the accelerator pedal and partly by the elongation of the link rod system responsive to the vacuum in the admission chamber.

Thus, since the same displacement of the pedal only imparts a smaller displacement to the slider, the gearing down of the control may be increased. This enables a smaller effort to be applied on the pedal to displace the combination of the butterfly-valve and the slider.

In accordance with a further particular feature of the invention, means are provided in order that the variations of the vacuum in the admission chamber of the engine may transmit their effect to the slider with a delay. These means preferably will consist of a throttling device and/or a substantial volume of capacity space between the vacuum pressure responsive actuator and the admission chamber of the engine. This has the result of improving the conditions of acceleration with the accelerator pressed down hard, and of braking by the engine.

More particularly, this avoids the phenomenon known as hunting, in which, after an abrupt and total depression of the accelerator pedal, the clutch is allowed prematurely to transmit a torque which is too large in view of the possibilities of the engine with respect to the resistive torque, which results in a slowing-down of the engine, followed by a partial disengagement of the clutch and then by a re-acceleration of the engine followed by a re-engagement of the clutch, which is disagreeable from the point of view of comfort.

In fact, according to the invention, when the pedal is fully depressed rapidly, the vacuum which influences the link-rod system has no time to vary during this operation because of the calibrated hole or other equivalent retarding means. The position of full opening of the butterfly-valve is thus reached with a large vacuum, and therefore with a substantial resistance still inserted in the supply circuit and giving possibilities of slip. It is only after an adjustable delay that the full torque is transmitted, thus avoiding hunting oscillations. In addition, the braking effect of the engine is improved: when a relatively small vacuum acts on the link-rod system, this small vacuum is maintained at the moment when the accelerator is abruptly released, which retards the moment at which the total resistance is inserted. The braking effect is therefore powerful but without abruptness to begin with, and is thereafter limited in a suitable manner.

It will be observed that under these two circumstances, the device described functions like a dash-pot. Such a dash-pot arrangement mounted on the link-rod system of the rheostat slider forms part of the invention whatever type of dash-pot may be used, single or double-acting, pneumatic or hydraulic or mechanical, etc., even if the dash-pot is utilized alone in order to obtain only a part of the advantages referred to above.

The system is favorable to resistance against fading of the clutch. It should be noted that fading of clutches consists in a reduction of the coefficient of friction of the clutch friction linings due to a prolonged slip under heavy load. In fact, fading occurs at the moment of mounting a curbstone for example, and the device according to the invention greatly facilitates this maneuver. In general, the user is often afraid of the phenomenon of hunting and therefore accelerates insufficiently, starting slip at high speed which produces fading. The intervention of the described device enables a momentary over-torque to be obtained by temporarily rendering the clutch capable of transmitting a torque higher than that which corresponds to the position of the accelerator desired by the driver.

The engine speed increases from the idling speed corresponding to a maximum vacuum during the course of the mechanical operation which accompanies the elimination of certain resistances. It is liable to fall during the course of the hydraulic operation which eliminates a supplementary resistance, when the pressure responsive actuator returns to the pressure of the pipe. The re-establishment of the vacuum re-introduces a resistance, whereby the engine is prevented from developing a torque less than that which the clutch can transmit.

In a particular non-limitative application of the invention to a variable resistance in the form of a rheostat with contact studs, the following arrangements can advantageously be made.

(1) The slider has to carry out an idle travel over the first stud without modification of the resistance. Thus, during a smooth start, the progression which accompanies the initial displacement of the butterfly-valve is solely due to the variation of the generator voltage. This progression which, with the usual system, is only obtained over a sector of small opening of the butterfly-valve, is maintained much longer with the system according to the invention, since the mechanical gearing-down is much greater while on the other hand the vacuum has practically not varied.

(2) The position of the slider, with the accelerator at full opening with maximum vacuum, is such that the last contact stud is not reached. Thus hunting is avoided, even with a rheostat with contact studs.

(3) With the accelerator closed, the engine stopped, and no vacuum, the slider reaches the second stud in order that the improved parking effect can be used to advantage.

(4) If the user abruptly releases the accelerator pedal when the vacuum is small, the vacuum does not immediately increase in the pressure responsive actuator, and the slider remains in contact with the second stud for an appreciable time before passing back to the first stud. In this way, an improvement of the engine braking effect is obtained.

(5) Butterfly-valve wide open and vacuum small: the slider reaches the limit of its travel on the last stud in order that the full torque is ensured when it is required.

(6) Butterfly-valve wide open and substantial vacuum: the slider passes on to the contact stud preceding the last one in order to take advantage of the possible economy in current.

The features and advantages of the invention will furthermore be brought out in the description which follows below of forms of embodiment chosen by way of example, reference being made to the accompanying drawings, in which.

Figure 1:
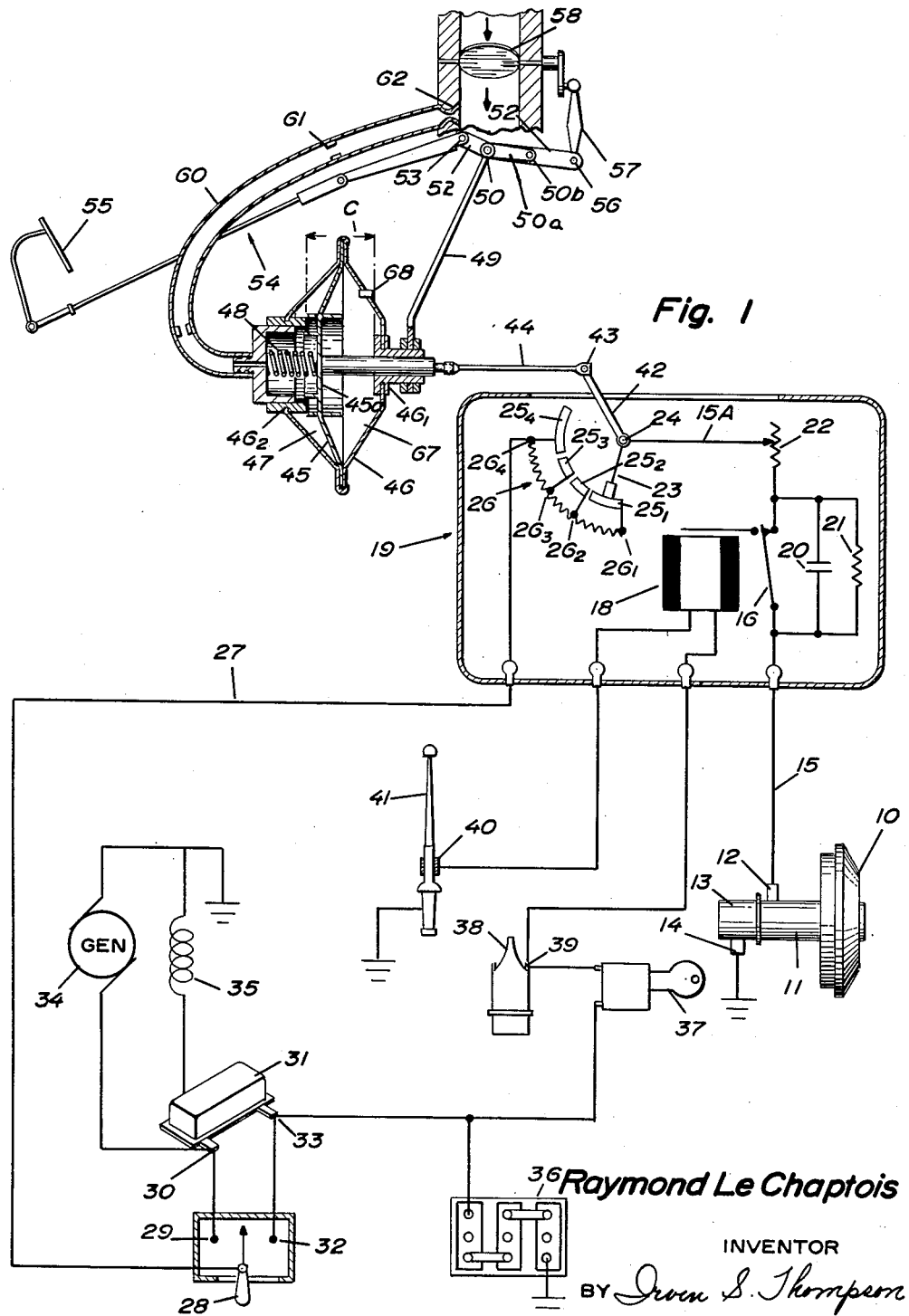
FIG. 1 is a diagrammatic view of a control for an electro-magnetic clutch in accordance with the invention.

Reference will first be made to the diagram shown in FIG. 1, which concerns by way of example an application of the invention to an electro-magnetic clutch 10 for an automobile vehicle.

This clutch has a transmissible torque which varies in the same sense as the electric voltage developed between its collector rings: one supply ring 11 with which a supply brush 12 is in rubbing contact, and a grounding ring 13 with its contact brush 14 which is connected to ground as shown.

The brush 12 is connected by a conductor 15 to one terminal of the normally-closed switch 16 of a coil relay 18, the elements 16 and 18 being housed in a box 19 mounted under the engine bonnet. The switch 16 is shunted by a condenser 20 and a resistor 21, intended to reduce wear of the contacts, these elements also being enclosed in the box 19.

The coil 18 of the relay switch 16 has one end connected to the battery terminal 39 of the ignition coil 38 of the vehicle and the other end is connected to ground through the intermediary of a switch 40. This latter switch is responsive to the operations of gear-changing, so as to cause the opening or closing of switch 16, depending on whether the gear-changing lever 41 is actuated by the user or left inoperative. In FIGURE 1 the lever 41 is shown released thus opening the switch 40 whereby the coil 18 is de-energized and the switch 16 is closed.

An adjustable resistor 22 which serves to compensate, if necessary, for the effects of wear of the friction linings in the clutch is also housed in the box 19. This resistor 22 is connected to the other terminal of switch 16, while its variable tap is connected by conductor 15A to a rotating slider 23. The latter is rotatably mounted at 24 in the box 19 and co-operates, in the example shown with a row of studs $25_1$, $25_2$, $25_3$, $25_4$ of a rheostat disposed along the arc of a circle. These contact studs are connected to points $26_1$, $26_2$, $26_3$, $26_4$ of a resistor 26.

The terminal point $26_4$ of the resistor 26 is connected to a conductor 27 which terminates at a reversing switch 28 having one terminal 29 connected to the generator terminal 30 of the voltage regulator 31 of the vehicle, while the other terminal 32 of the reversing switch 28 is connected to the battery terminal 33 of the regulator 31. There is shown at 34 the generator of the vehicle with its field winding 35, at 36 the battery of the vehicle, and at 37 the general ignition contact which couples the battery 36 and the terminal 39 of the coil 38.

Irrespective of which source 34 or 36 is employed to supply the electro-magnetic clutch 10, the voltage developed at the terminals of the said electro-magnetic clutch 10 varies in dependence on the angular position of the slider 23, which determines the amount of resistance introduced by resistor 26 into the electrical supply circuit of the clutch.

The slider 23 is rigidly fixed to a lever 42 which is rotatably mounted at 24 and on which a rod 44 is pivoted at 43. The latter is connected to the diaphragm 45 of a pressure responsive actuator, the casing of which is shown at 46. The diaphragm 45 is coupled to the rod 44 and tends to be increasingly forced towards the left-hand side of FIG. 1 as the vacuum in the chamber 47 on the left side of the diaphragm in casing 46 increases, while a spring 48 tends to return the unit 45—44 towards the right. The other chamber 67 in casing 46 is maintained at atmospheric pressure by means of a vent 68 provided through casing 46.

The casing 46 (FIGS. 1 and 2) is carried by a fork 49 rigid with a tube 50 which is rotatably mounted about a stationary axis. The tube 50 is rigid with an arm $50a$ pivotally connected at $50b$ with a lever 52 which pivots about the axis 51. This lever 52 forms part of the throttle linkage of the engine. The extremity 53 of the lever 52 is connected through a rod system 54 to the accelerator pedal 55, while the other extremity 56 of the lever 52 is pivotally connected with a crank-arm 57 which is connected to the butterfly-valve 58 of the carburetor 59 of the engine. The chamber 47 of the casing 46 is coupled by a flexible pipe 60 having a calibrated hole 61 and/or having a considerable length, to a source of vacuum 62 in the admission pipe of the engine, at a point intermediate between the butterfly-valve and the engine valves.

The calibrated hole 61 is close to the point 62 or is coincident with it, in order to increase the proper capacity of the chamber 47.

With a control system of this kind, the amount of resistance inserted by means of the resistor 26 in the electrical supply circuit of the clutch 10 (i.e., the circuit which comprises either generator 34 or battery 36, reversing switch 28, conductor 27, resistor 26, one of the contact studs, slider 23, conductor 15A, switch 16, conductor 15, brushes 12 and 14, the clutch itself, and ground) varies in dependence upon two factors whose actions are additive. One of these factors is the position of opening of the butterfly-valve 58, while the other is the degree of vacuum in the chamber 47, that is to say indirectly, the driving torque corrected by a time-delay device. For a given degree of vacuum at 47 which corresponds to a definite position of the diaphragm 45 in the casing 46, the amount of resistance introduced at 26 into the aforementioned clutch supply circuit becomes increasingly large as the butterfly-valve 58 is closed, that is to say as the pressure on the accelerator pedal 55 is reduced. On the other hand, for a given position of opening of the butterfly-valve 58, which corresponds to a definite position of depression of the accelerator pedal 55, the amount of resistance introduced at 26 into the electrical supply circuit becomes increasingly large as the diaphragm 45 moves more to the left in the casing 46, that is to say as the vacuum in the chamber 47 increases.

Figure 2:
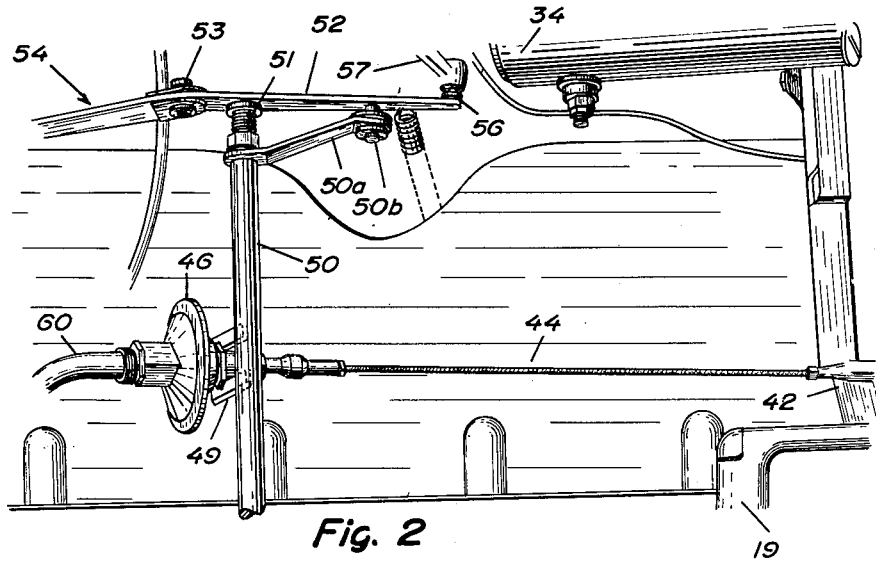
FIG. 2 shows on a larger scale and in perspective, a detail of the control of the electric supply box of the clutch.

As can be seen from FIG. 1, the diaphragm 45 is movably mounted in the casing 46 between two extreme positions: one in which the central cup 45a of the diaphragm 45 abuts against the sleeve $46_1$ of the casing 46, and which corresponds to small vacuum at 47, less than the force $F_1$ in the spring 48 which is then only slightly compressed; the other in which the central cup 45a abuts against the part $46_2$ of the casing 46, and which corresponds to large vacuum at 47, larger than the force $F_2$ which in turn is greater than $F_1$, in the spring 48 which is then highly compressed. The travel C of the diaphragm 45 between these two extreme positions is selected by taking account of the fraction of the resistor 26 which it is desired to cover by the slider 23, when, for a given position of the accelerator, the vacuum in the chamber 47 passes from a low value to a high value.

Figure 3:
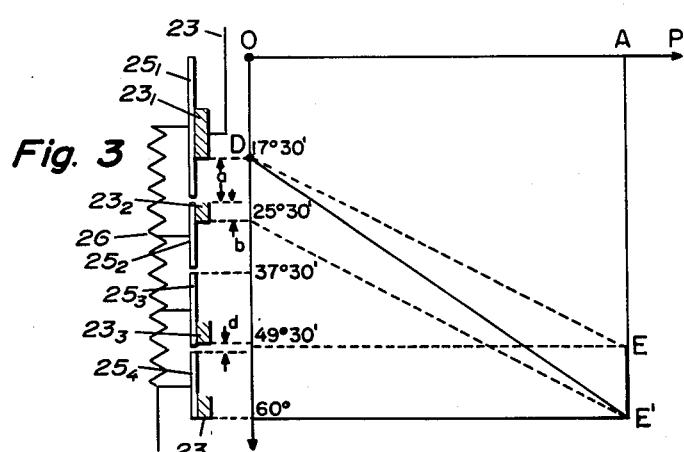
FIG. 3 is a curve illustrating the performances of the control according to the invention with a rheostat having contact studs.

More particularly, if reference is made to the curve of FIG. 3, in which the angles of opening of the butterfly-valve have been plotted as abscissae OP and the angular travel of the slider 23 as ordinates OC, this travel reaching 60° for the full opening OA of the butterfly-valve and for no vacuum at 47, it will be observed that the arrangements according to the invention are such that the following conditions are satisfied:

(1) When the accelerator is closed and the vacuum is a maximum (the position farthest to the left of the point 43 of FIG. 1), the slider 23 is at $23_1$ (FIG. 3), on the first contact stud $25_1$. In this extreme position, the slider has a travel $a$ to make before reaching the second stud.

(2) When the accelerator is closed and there is no vacuum, for example when the engine is stopped, the link-rod system 44 is displaced from the preceding position through a distance equal to the travel C, effected by the diaphragm 45, and this brings the slider 23 to $23_2$ (FIG. 3) on the second stud $25_2$. It will be seen later that this condition permits very effective immobilization of the vehicle when parked, due to the effect of the engine compression when stopped.

(3) When the accelerator is closed and the vacuum is relatively small, the slider 23 can occupy the second stud $25_2$, by virtue of the clearance $b$ which separates the entry of the second contact from the position $23_2$. It will be seen later that this condition enables the application of the engine brake to be improved.

(4) When the accelerator is open and the vacuum is a maximum, the rod-link system 44 is located towards the right of FIG. 1 and is separated from the farthest right-hand position by the travel C of the diaphragm 45, so that the slider 23 can be at $23_3$ (FIG. 3) on the third contact $25_3$. It will be shown below that this condition enables the phenomenon of hunting to be prevented.

(5) When the accelerator is open and the vacuum is relatively large instead of being a maximum, the slider 23 can stay on the third stud $25_3$ by virtue of the clearance $d$ which separates the position $23_3$ from the entry of the fourth stud. It will be seen later that this condition permits of an economy in current at cruising speed.

(6) When the accelerator is open and the vacuum is very small, the rod-link system 44 occupies its farthest right-hand position and the slider 23 is at $23_4$ (FIG. 3) on the fourth stud $25_4$. The resistance at 26 is then completely cut-out of circuit.

In normal working, the reversing switch 28 is placed on the generator contact 29, so that the speed of rotation of the engine determines the voltage of the clutch circuit and adds its effect to those of the other factors, opening of the throttle and vacuum, time delay, which act on the rheostat 23–26.

At the idling speed of the engine with the accelerator pedal released, the generator 34 delivers very little current, and the current applied to the clutch will be smaller when the slider 23 is on the first contact stud $25_1$ (closure of the butterfly-valve 58 and high vacuum at 47), thus introducing the whole resistance of resistor 26 into the circuit. The torque transmissible by the clutch is nil. There is no risk of driving the vehicle when stopped, as long as the user has not shown his wish to start up by depressing the pedal 55. This condition of the control is illustrated by the point D of the curve of FIG. 3.

When the user presses very slightly on the accelerator pedal 55 to start off, for example when carrying out a delicate maneuver, the vacuum at 62 and in consequence at 47 falls only slightly, the progressive elimination of the resistances is very gradual, and is illustrated by the starting phase of the line from D to E (in dotted lines) in FIG. 3. The engagement of the clutch is itself very gradual and permits the desired delicate maneuver.

If the user presses hard on the accelerator in order to start off rapidly, the vacuum falls instantaneously at 62, but this fall is delayed before reaching chamber 47 by virtue of the calibrated orifice 61. The movement is transmitted from the butterfly-valve to the slider according to the curve DE. With a rapid elimination of a part only of the resistances, any abrupt engagement liable to produce a hunting phenomenon is avoided. If the acceleration is effected slowly and to the full, the movement is transmitted according to the line DE' (in full line) of FIG. 3. Between these two extreme conditions referred to above, that is to say when the user presses moderately on the accelerator pedal with a view to starting off steadily but not slowly, the progression is illustrated by a line comprised between the lines DE and DE'.

During the operations of gear changing, the opening of the switch 16 ensures the breaking of the supply circuit of the clutch and in consequence its disengagement.

During operation at cruising speed at which the engine does not develop its full torque, the vacuum is small at 62 and also therefore at 47. When this takes place at full opening, which implies a small resistive torque, the slider 23 is located on the stud $25_3$, thereby introducing the resistance section $26_3$–$26_4$. The same backward movement of the slider is obtained for any opening of the butterfly-valve with a small vacuum. The consumption of current is thus reduced in all cases without giving rise to any slip in the clutch, since the driving torque is then small and is fully transmitted by the clutch, even when only partially energized.

During operation at full engine torque, the vacuum at 62 and in consequence at 47 becomes large. The slider 23 thus passes on to the last stud $25_4$, thus permitting the full energization of the clutch for the transmission of the torque.

When it is desired to slow-down the vehicle while the butterfly-valve is open, the user completely releases the accelerator pedal. The increase in the vacuum which results at 62 does not appear immediately at 47 by reason of the throttle at 61, so that only a part of the resistance at 26 is at first inserted in the clutch supply circuit and permits the transmission of a susbtantial engine braking torque, but short of and in the vicinity of the skidding limit with bad adhesion, this phase being followed by the introduction of all the resistance of resistor 26 as soon as the vacuum at 47 has become as large as at 62.

The reversing switch 28 will be placed on the battery terminal 33 either if the generator 34 is defective or with the object of locking the vehicle when stationary, with a gear engaged, by the effect of the engine compression. In this latter case, it will be noted that when the engine is stopped, there is no vacuum at 47, so that the slider 23 contacts the second stud $25_2$. This enables a part only of the resistance at 26 to be introduced into the supply circuit, such that the clutch can transmit a torque sufficient for the vehicle to be definitely and positively immobilized. By virtue of the device described above, an excellent operation of the clutch has been obtained without the necessity of complicating the circuit by the introduction of a micro-switch coupled to the gear-box and providing two resistance steps.

Figure 4:
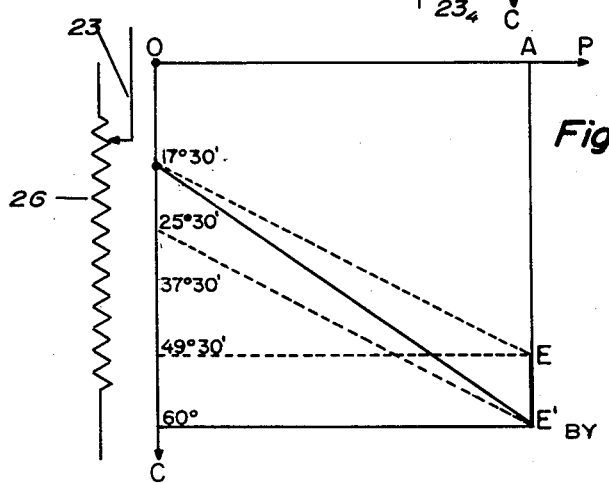
FIG. 4 is a curve similar to FIG. 3, but relating to an alternative form of the invention, in which the rheostat is of the continuous type.

In an alternative form (FIG. 4), the rheostat 23–26 is of the continuous type instead of having contact studs in steps $25_1$, $25_2$, $25_3$, $25_4$. The operation is similar to that which has been previously described.

It will of course be understood that the invention is not limited to the forms of embodiment described and shown, but includes all alternative forms.

What I claim is:

1. A control system for an electro-magnetic clutch of an automotive vehicle engine having a fuel admission chamber which also provides a source of vacuum, a throttle valve which adjusts the flow of fuel feeding said chamber, a throttle linkage operatively connected to said valve to control the valve setting, and an accelerator pedal coupled to said throttle linkage for controlling the latter, said clutch control system comprising an electrical supply circuit connected to said clutch to supply actuating voltage thereto, said electrical supply circuit including in series therewith a variable resistor having a movable slider contact for varying the effective resistance of the variable resistor and thereby varying the actuating voltage to said clutch, connecting means operatively connecting said throttle linkage to said slider contact, said connecting means including a pressure responsive actuator means for adjusting said connecting means to move said slider contact independently of said throttle linkage but in accordance with variations of pressure in the actuator means, and conduit means operatively connecting said actuator means to the fuel admission chamber acting as a source of vacuum so that the position of said slider contact upon said resistor depends upon both the throttle linkage position and the degree of vacuum in said fuel admission chamber.

2. A control system for an electro-magnetic clutch of a vehicle engine having a fuel chamber, a throttle valve which adjusts the flow of fuel into said fuel chamber, a throttle linkage operatively connected to said valve to determine its setting, and an accelerator connected to said linkage for controlling the latter, said system comprising an electrical supply circuit applying actuating voltage to said clutch, a variable resistor included in said supply circuit in series therewith, said variable resistor having a movable slider contacting said resistor to vary its resistance in said supply circuit and thereby vary the actuating voltage to said clutch, means operatively connecting said throttle linkage to said slider, said connecting means including a pressure responsive means for so controlling said connecting means that said slider is moved according to pressure variations in the pressure responsive means at any position of said linkage, said fuel chamber having a variable vacuum therein, and conduit means operatively connecting said pressure responsive means to said fuel chamber, the position of said slider upon said resistor thereby depending upon both the throttle linkage position and the degree of vacuum in said fuel chamber.

3. A control system as claimed in claim 1 wherein said conduit means includes throttling means for imposing a time-delay on the transmission of pressure variations in said fuel admission chamber to said actuator means.

4. A control system as claimed in claim 1 wherein the conduit means comprises a volume large enough to impose a time-delay on the transmission of pressure variations in said fuel admission chamber to said actuator means.

5. A control system as claimed in claim 1 wherein said connecting means comprises a sleeve member connected with said throttle linkage and a rod connected with said slider contact, said rod and said sleeve member being coaxial and mounted for axial movement with respect to each other, said actuator means being mounted on said sleeve member so as to vary the axial position of said rod with respect to said sleeve member upon pressure variations in said conduit means.

6. A control system as claimed in claim 5 furthermore comprising abutment means on said rod for limiting the axial stroke of the rod with respect to the sleeve member to a predetermined length.

7. A control system as claimed in claim 5 wherein said actuator means comprises a casing fixed to said sleeve member, and a flexible diaphragm peripherally connected to said casing and centrally connected to said rod, said casing and said diaphragm defining an actuator chamber communicating with said conduit means.

8. A control system as claimed in claim 7 wherein said actuator means furthermore comprises a spring means acting between said casing and said diaphragm.

References Cited in the file of this patent
UNITED STATES PATENTS

| | | |
|---|---|---|
| 2,566,631 | Price | Sept. 4, 1951 |
| 2,922,503 | Maurice et al. | Jan. 26, 1960 |

FOREIGN PATENTS

| | | |
|---|---|---|
| 1,035,713 | France | Apr. 22, 1953 |